Dec. 25, 1923.
H. R. BRUNNER
1,478,731
AIR PREHEATING DEVICE FOR FURNACES
Original Filed Oct. 7, 1915    4 Sheets-Sheet 1
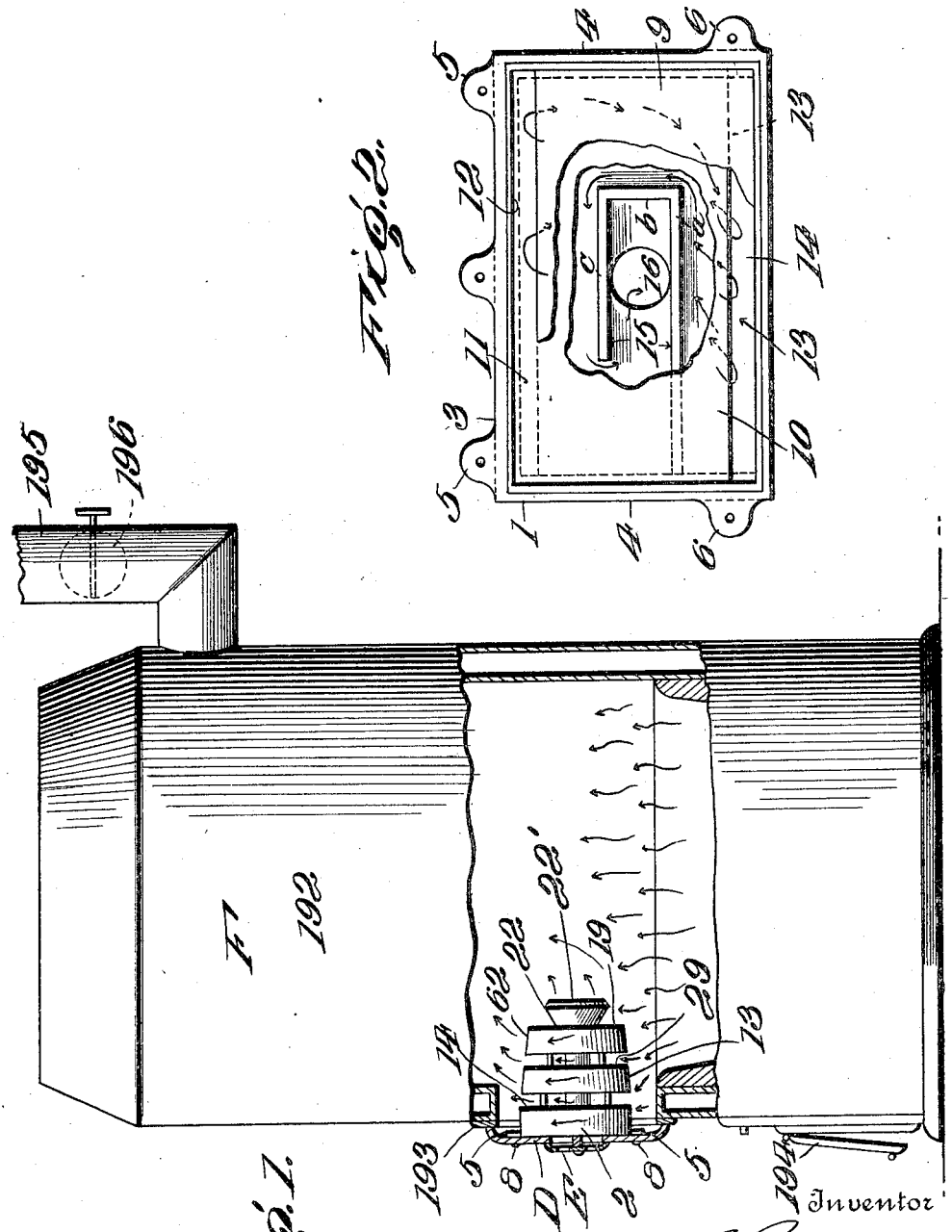

Dec. 25, 1923. 1,478,731
H. R. BRUNNER
AIR PREHEATING DEVICE FOR FURNACES
Original Filed Oct. 7, 1915 4 Sheets-Sheet 2
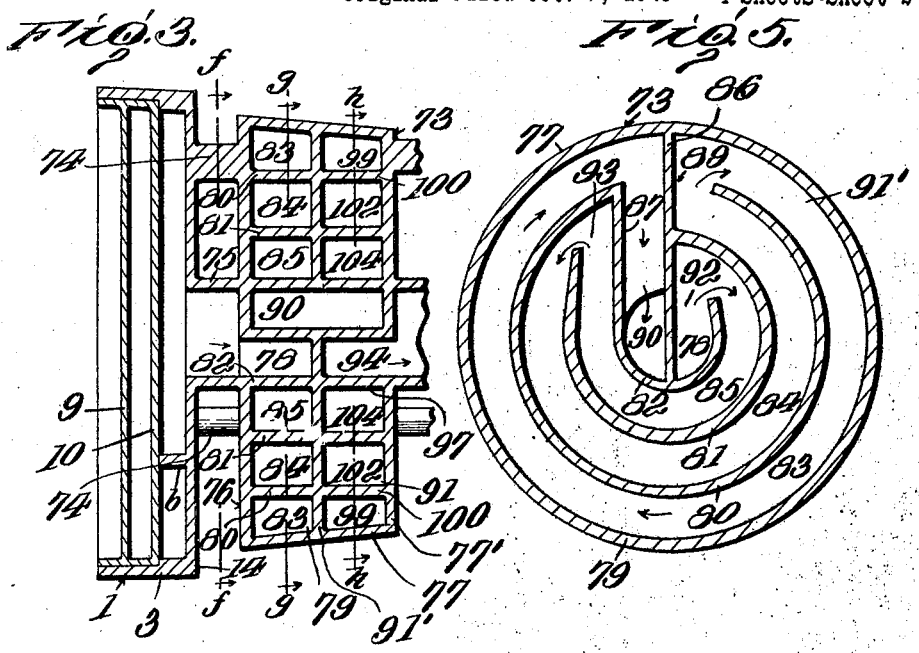
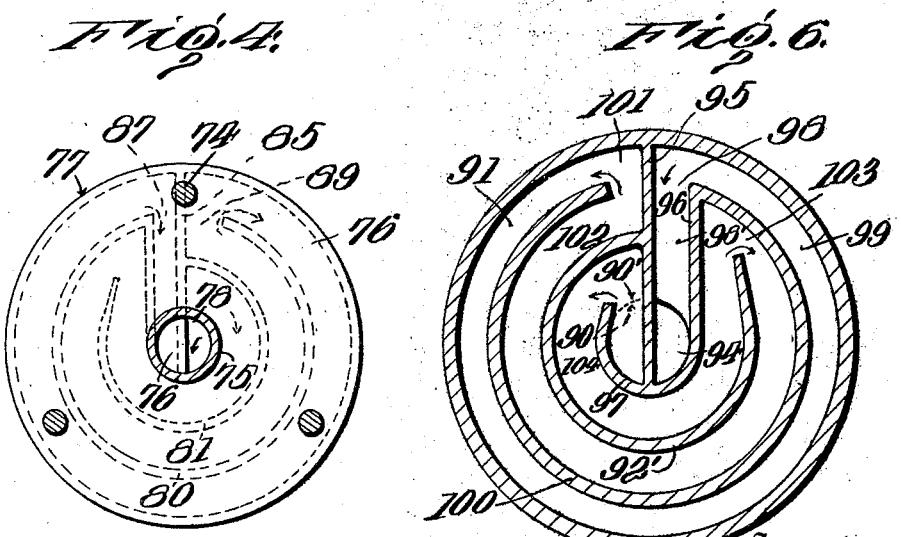

Dec. 25, 1923.
H. R. BRUNNER
AIR PREHEATING DEVICE FOR FURNACES
Original Filed Oct. 7, 1915    4 Sheets-Sheet 3
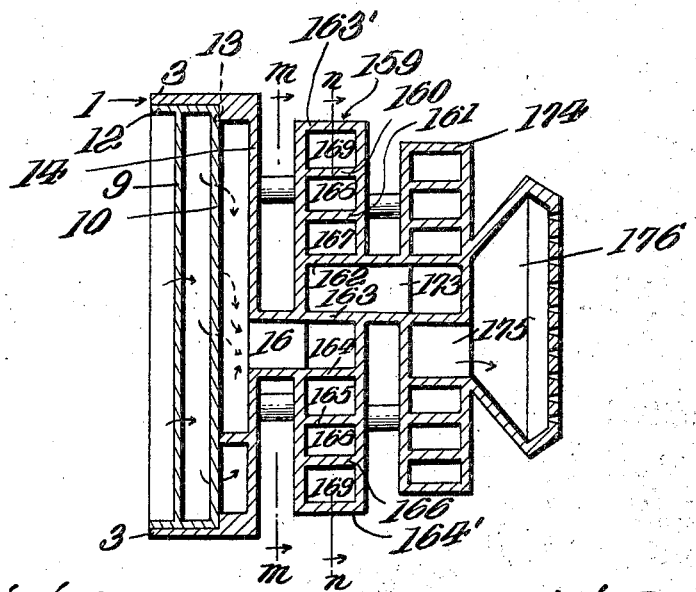
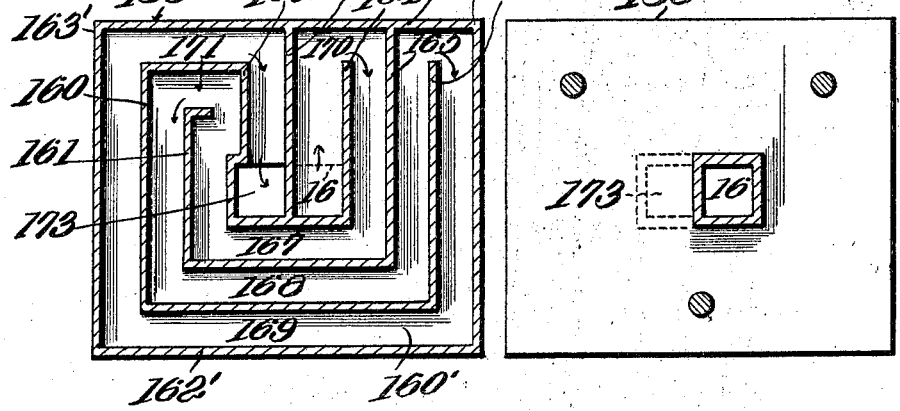

Dec. 25, 1923.
H. R. BRUNNER
1,478,731
AIR PREHEATING DEVICE FOR FURNACES
Original Filed Oct. 7, 1915    4 Sheets-Sheet 4
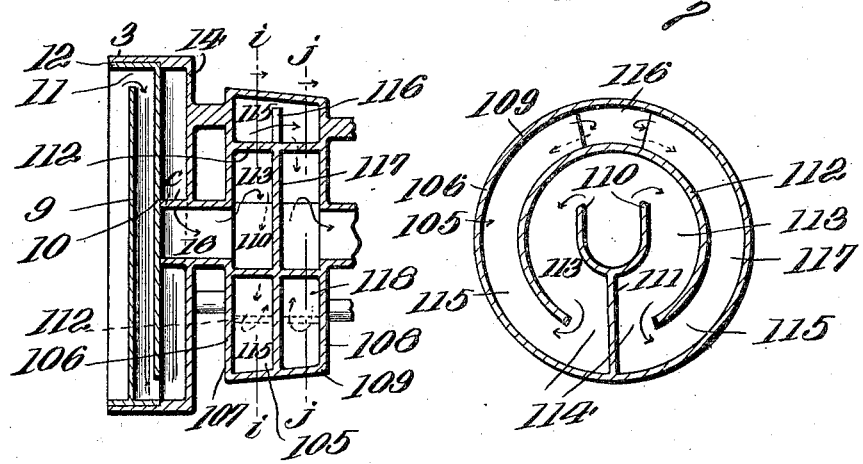
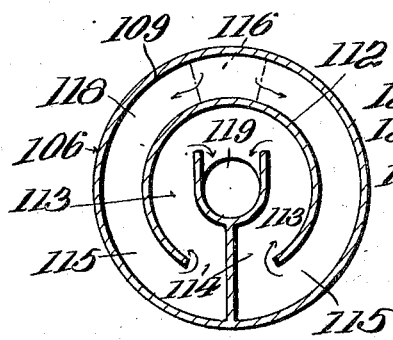
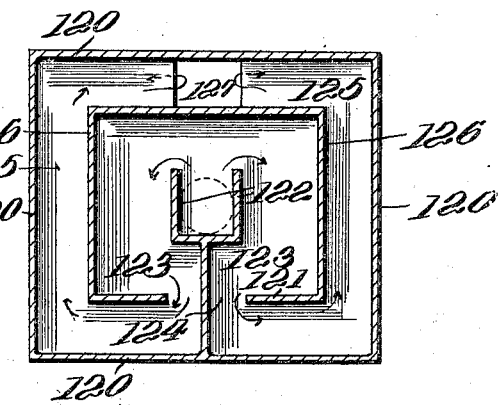
Inventor
Herbert R. Brunner
By Titian H. Johnson
& Dempster W. Smith
Attorneys Patented Dec. 25, 1923.

1,478,731

UNITED STATES PATENT OFFICE.

HERBERT R. BRUNNER, OF NEW YORK, N. Y., ASSIGNOR, BY MESNE ASSIGNMENTS, TO VAN KANNEL REVOLVING DOOR COMPANY, OF NEW YORK, N. Y., A CORPORATION OF NEW JERSEY.

AIR-PREHEATING DEVICE FOR FURNACES.

Original application filed October 7, 1915, Serial No. 54,631. Divided and this application filed December 12, 1919. Serial No. 344,341.

*To all whom it may concern:*

Be it known that I, HERBERT R. BRUNNER, a citizen of the United States, residing at New York, in the county of New York and State of New York, have invented certain new and useful Improvements in Air-Preheating Devices for Furnaces, of which the following is a specification.

This invention relates to air preheating devices for furnaces, and is a division of my application Serial Number 54,631, filed October, 7, 1915, which eventuated in Patent Number 1,354,950, dated October 5, 1920.

The object of the invention is to provide a preheating element adapted for attachment to the fire boxes of stoves, furnaces, steam boilers and the like, and preferably to the doors of such preheating apparatus, in position to deliver preheated air into the fire box to mingle with the products of combustion of the stove, furnace, etc., and to make the action of the preheater practically automatic in meeting the changing or variable draft conditions from the minimum to the maximum, the preheater being designed to deliver, under any of the variable draft conditions of the fire box, a well-proportioned amount of adequately preheated air.

The invention resides in the peculiar construction of the device shown and illustrated in the drawings, in which, Figure 1 is an elevation of a furnace of ordinary construction showing the manner of attaching the preheater;

Figure 2 is a view looking into the entrance chamber, the outer and inner baffle plates being partly broken away to show the direction of the travel of the air and the formation of the rear wall of the entrance chamber and the baffle walls;

Figure 3 is a horizontal section of a preheating element, wherein the air is brought into the casing on one side of the casing, and caused to circulate back and forth in one compartment and be delivered into a second compartment, where it circulates in opposite direction;

Figure 4 is a vertical section of the element taken on line $f$—$f$ of Figure 3;

Figure 5 is a similar section taken on line $g$—$g$ of Figure 3;

Figure 6 is a vertical section taken on line $h$—$h$ of Figure 3;

Figure 7 is a horizontal central sectional view of a modified form wherein the construction of the casing and baffle walls are angular, but corresponding in general construction and operation to the form illustrated in Figures 3, 4, 5 and 6, wherein the air is taken in on one side of a partition and leaves the adjacent compartment on the opposite side of the partition;

Figure 8 is a vertical section taken on the line $m$—$m$ of Figure 7;

Figure 9 is a similar section taken on the line $n$—$n$ of Figure 7;

Figure 10 is a vertical section of still another modified form of preheater;

Figure 11 is a vertical section taken on the line $i$—$i$ of Figure 10;

Figure 12 is a similar view taken on the line $j$—$j$ of Figure 10; and

Figure 13 is a sectional view of the chamber of a preheater in which the manner of air circulation and baffling is the same as that shown in the Figures 10, 11 and 12, the casing, however, being angular in form.

Figure 1 shows an ordinary furnace F having a fire door D provided with adjustable damper E. One form of an air preheater embodying the invention is shown attached to the back of the door. In this form the preheater comprises a plurality of chambers spaced away from each other to admit the heat of combustion between and around the chambers. The numeral 2 designates what I will term the entrance chamber. This is preferably rectangular in form, as shown in Figure 2, and formed of top and bottom flanges 3, and end flanges 4, there being lugs 5 cast on the top flange 3 and lugs 6 integral with the end flanges 4, which lugs are for the purpose of affording means of securing the whole casing to the furnace door 7. Bolts 8 may be employed for this purpose, and it will be understood that the whole device preferably, is carried by the furnace door, and swings into and out of the position with relation to the fire box.

Within the entrance chamber 2, I provide two baffle plates 9 and 10. The front plate 9 covers the front part of the chamber 2, with the exception of a longitudinal passage 11, formed between the upper edge of said plate, and the upper flange 12 of the plate 10, and the plate 10 covers the space within the entrance chamber, with the exception of a horizontal opening 13, which is similar to the opening 11. The rear wall 14 of the entrance chamber has integral therewith, a baffle wall 15, and extends forwardly, where its inner edge abuts against the inner face of the plate 10. This wall 15 is formed of horizontal and vertical portions $a$, $b$ and $c$, so that the air in passing into the rear part of the entrance chamber, will be prevented from passing directly to the central outlet 16, which is formed through a central boss 75, which establishes communication between the entrance chamber and the circular chamber 73, there being, in addition to the boss 75, a number of solid bosses 74, which rigidly connect the entrance chamber with chamber 77. This chamber 73 is preferably circular in form and provided with circularly arranged baffle walls, as will be described. The chamber 73 is divided into compartments 91, and 79, by central wall 91'.

The wall 76 is provided with a semicircular opening 78 therein, leading into compartment 79 in the chamber 73, in which compartment is arranged a series of circular baffle walls 80, 81 and 82, in connection with each other and the circular peripheral wall 77 of the casing, and walls 76 and 91', form a series of channels 83, 84, and 85. The baffle wall 86 is radial and integral with circular wall 77 and with the curved central portion of the baffle wall 82, which wall (82) is a continuation of the straight wall 87, and the inner portion of wall 82 stops short of baffle wall 86, forming a passage 92, establishing communication between 78 and 85. The wall 81 is integral with the baffle wall 86 and stops short of wall 80, forming passage 93, establishing communication between passages 85 and 84, and baffle wall 80 is integral with wall 87 and stops short of baffle wall 86, forming passage 89, which establishes communication between passages 84 and 83. This arrangement of baffle walls establishes a continuous passage for the air in the direction of the arrow from 78 through passages 85, 84, 83 and 87', to and through the opening 90 which is in the central division of wall 91', and which establishes communication between compartments 79 and 91. The air passing through the opening 90, passes into the compartment 91, where it is delivered through passage 90' to channel 104; through channel 103 to channel 102 and through passage 101 to channel 99, and thence through passage 98 through straight channel 98' to opening 94. In compartment 91, baffle wall 95 is radial and is integral with the circular outer wall 77 and the inner circular wall 97. The inner portion of wall 97 stops short of baffle wall 95, forming passage 90' which establishes communication between 90 and 104. The other end of inner circular wall 97 is a continuation of straight baffle wall 96. Intermediate circular baffle wall 92' is integral with baffle wall 95, and stops short of baffle wall 96, forming passage 103 which establishes communication between channels 104 and 102. Outer circular baffle wall 100 is integral with one end of wall 96 and stops short of baffle wall 95, forming passage 101, which establishes communication between channels 102 and 99. By means of this arrangement just described, the air is passed from 90 through passage 90', through channels 104, 102 and 99, through passage 98, channel 98' in the direction of the arrows to outlet opening 94. At 94, there is a semicircular opening through the outer wall of chamber 73, communicating with the passage established by the boss, etc., through which passage it may be delivered to a discharge or distributing chamber 62 (see Figure 1) which may have interior partitions providing chambers similar to those described in connection with preheating chamber 73, the final channel being arranged to discharge into a distributer 22 provided at 22' with a suitable number of apertures or nozzles through which the preheated air is delivered into the fire box. Otherwise the internal arrangement of chamber 62 may be as described in my original application previously referred to, or it may be similar to other forms of the preheating chamber hereinafter described.

In the modification shown in Figures 7, 8 and 9, the entrance chamber is the same as the other figures, and communication with a chamber 159 formed of front and rear walls 159' and 160', top and bottom walls 161' and 162' and side walls 163' and 164' through the opening 16 in the central boss. The construction and operation of the heating chambers in this form, are substantially like the construction shown in Figures 1 to 6, inclusive, except that, in the form about to be described, the angular or straight channels are formed by the provision of straight baffle walls, which, together with each other, and the top and sides of the casing, form the channels. The air, entering from the entrance chamber, through the opening 16, is received in the central portion of the chamber 159, as will appear. Within this chamber, I provide a series of angular baffle walls 160, 161, 162, 163, 164, 165, and 166, which in connection with each other, and the sides and bottom and top of the casing, form angular channels 167, 168 and 169. The air enters through the opening 16 leading from the entrance chamber, (at the central portion of the casing) between the baffle walls 163 and 164, and through the passage 170, enters the channel 167, from whence it passes through the passage 171, to the passage 168, and through the passage 172, it passes to the channel 169, which leads to the opening 173, through which it passes into the rear chamber 174, and after passing through the channels formed by the various baffles in the chamber 174, the air passes through opening 175, to and through the distributor end 176.

In cases where a large amount of air is required to be preheated, as in furnaces of large capacity, in which the draft pull is very strong, it is not feasible or practical to supply the necessary preheated air by increasing the cross sectional area of the channels, through which the preheated air passes, it being demonstrated by experiment that when this area is increased beyond a certain point, the frictional loss, resulting from the flowing contact of the air with the side walls of the channels, falls to that below what is necessary to supply air proportionate to the draft variations. To meet this exigency, I have devised the arrangement shown in Figures 10, 11 and 12, wherein the incoming volume of air in each preheating element is divided into two streams, and caused to pass through two channels at the same time, and in opposite directions. In this form, the entrance chamber may remain the same as in Figures 1 and 2, and the air passing through the passage 16 from the entrance chamber, enters the compartment 105 of the chamber 106, which chamber is formed as in the other instances, of front and rear walls 107, and 108 and peripheral wall 109. The air passing through the passage 16, enters the center of the compartment 105, between the arms 110 of a Y-shape baffle, the straight portion 111 of which is integral with the peripheral wall of the casing. The numeral 112 designates a concentric baffle wall between which and the Y-shape baffle, circular channels 113 are formed, which communicate through passages 114, between the ends of the wall 112, and the straight portion of the central Y-shape baffle, with two outer circular channels 115, which lead from opposite sides to an opening 116, in the partition wall 117, centrally arranged within the chamber. Through this opening, the stream of air, after having circulated within the compartment 105 and having been divided therein, passes into the compartment 118, at a point adjacent to the peripheral wall, instead of at the center, where it entered the first compartment. The second compartment 118, as shown in Figure 12, is provided with baffles corresponding in every respect to those in the first compartment, and the baffles in this compartment are designated by the same reference characters, the difference being that there is provided in this chamber, an outlet opening 119, through which the air, after having circulated in the compartment, and being divided therein, may pass into another chamber, or any number of chambers, of the same construction before passing directly through a distributor end, such as is shown at 22 in Figure 1. As shown in Figure 12, the air, as it enters the compartment through the opening 116, is divided into two streams, which pass in opposite directions through the various channels and passages until it reaches the outlet opening 119.

In Figure 13, the shape of the device merely is changed, and but one compartment is shown, which is sufficient to illustrate the structure. In this form, the chamber is composed of straight outer walls 120 and a central Y-shape baffle 121, between the arms 122 of which the air from the preceeding compartment, where they are arranged in groups, enters and is divided into opposite streams, and passed first through angular channels 123, and through passages 124 into two channels 125, which are formed between the outer walls of the chamber, and the baffle walls 126, the air passing out of the compartment, through an opening 127, adjacent to one of the walls of an adjoining compartment, the action being like that described in connection with Figures 11 and 12.

In the different forms of the invention described, the air, in passing through the preheating element, is caused to travel in several different directions or is subjected to sharp reversals, in its circumferential travel within the casing, and is also caused, at intervals to travel at right angles to its general line of travel in passing through the openings in the partitions, and in passing from one compartment to the other, and from one chamber to the other, which method of travelling, together with the proper proportioning in cross sectional area of the channels through which the air passes, limits, automatically, that is to say, without the aid of movable dampers or the like, the acceleration of the flow of the air through the casing, which in a particular device, is relative to the heating conditions in the furnace. When a preheating device of suitable design is attached to a furnace of certain capacity, the flow of air is adjusted automatically by static means to variations in the draft of the furnace between the minimum to the maximum. The amount of air supplied to the draft, for instance when the draft pull is comparatively great, as when a furnace is working under heavy load, an additional amount of highly preheated air will be supplied, but not an excessive amount, or an amount sufficient to chill the fire. This is on account of the increased frictional resistance caused by the structure of the preheater to the increased flow of air occasioned by the increased draft.

The principles of the invention, and its mode of operation have been more fully described in the previously mentioned original application, of which this is a division.

Having thus described my invention, what I claim is:

1. An air preheating device for furnaces and the like, comprising an intake chamber and a heating chamber having a connecting passage, the heating chamber enclosing compartments provided with partitions defining in each compartment a continuous air channel leading in a general direction from the center toward the periphery of the chamber, and including a plurality of sharp reversals by which air is caused to move repeatedly in opposite directions in adjacent parts of the channel in its course from one end of the channel to the other, the chambers and channels having axial connections by which air is caused to circulate outwardly in one of the compartments and inwardly in another one of the compartments of the heating chamber.

2. An air preheating device for furnaces and the like, comprising an intake chamber, a discharge chamber, and an intermediate heating chamber, the heating chamber enclosing compartments having channels in axial communication and arranged to cause outward and inward movements of air currents in continuous paths, with a plurality of abrupt changes in direction in their general outward and inward course, the changes being so proportioned in capacity relative to the draft requirements, that only the required amount of preheated air to insure proper combustion is delivered to the furnace under varying draft conditions.

3. An air preheating device for furnaces and the like, comprising a structure provided at one end with an intake chamber, at the other end with a discharge chamber, and also provided with an intermediate heating chamber, the chambers being connected by an interrupted passage; the heating chamber being formed with compartments having axial communication, and means whereby air currents are caused to traverse continuously outward and inward paths in opposite directions, with reversals of movement in each general movement, from the intake to the discharge chamber.

4. An air preheating device for furnaces and the like, comprising an intake chamber provided with baffles, a discharge chamber, and an intermediate heating chamber enclosing compartments having axial communication, the compartments having baffles defining curvilinear channels running in opposite directions to impart outward and inward travel to an air current with a plurality of reversals of direction in each of the compartments.

5. A device for preheating air for aiding combustion in furnaces and the like, comprising a casing adapted to be attached to the furnace and to extend into the fire pot thereof, and formed with an entrance chamber, and a second chamber communicating with the entrance chamber and having a partition therein which, together with the walls of the second chamber divide the said chamber into compartments, baffle walls integral with the partition and with the walls of the casing, an opening in the partition whereby the compartments are placed in intercommunication, the said baffle walls being so arranged that the air will be caused to circulate outwardly in one direction and completely through the first compartment with a plurality of abrupt reversals of flow and passing through the openings in the partition, will be caused to circulate inwardly in the opposite direction in the second compartment with a plurality of abrupt reversals of flow, and an outlet in the second compartment for the discharge of preheated air.

6 In an air preheater for furnaces and the like, adapted to be secured to the inside of the fire door, a unitary metal body comprising an entrance chamber, a discharge chamber, and an intermediate heating chamber, the chambers being connected by an axial passage and by separated lugs and otherwise separated from each other to permit products of combustion to flow between them, the entrance chamber being provided with baffles, the heating chamber comprising two compartments, each compartment being provided with partitions of generally circular form, defining in each compartment an air passage leading from the axial passage to the periphery of the chamber and then in a generally inward direction with a number of abrupt reversals of course back to the axial passage; parts of the axial passage providing communication between the compartments of the chamber; the partitions in the adjacent compartments being arranged to cause the air to flow in opposite directions in the two compartments.

In testimony whereof I affix my signature in presence of two witnesses.

HERBERT R. BRUNNER.

Witnesses:
H. C. STINNER,
J. F. BLANCHARD.